UNITED STATES PATENT OFFICE.

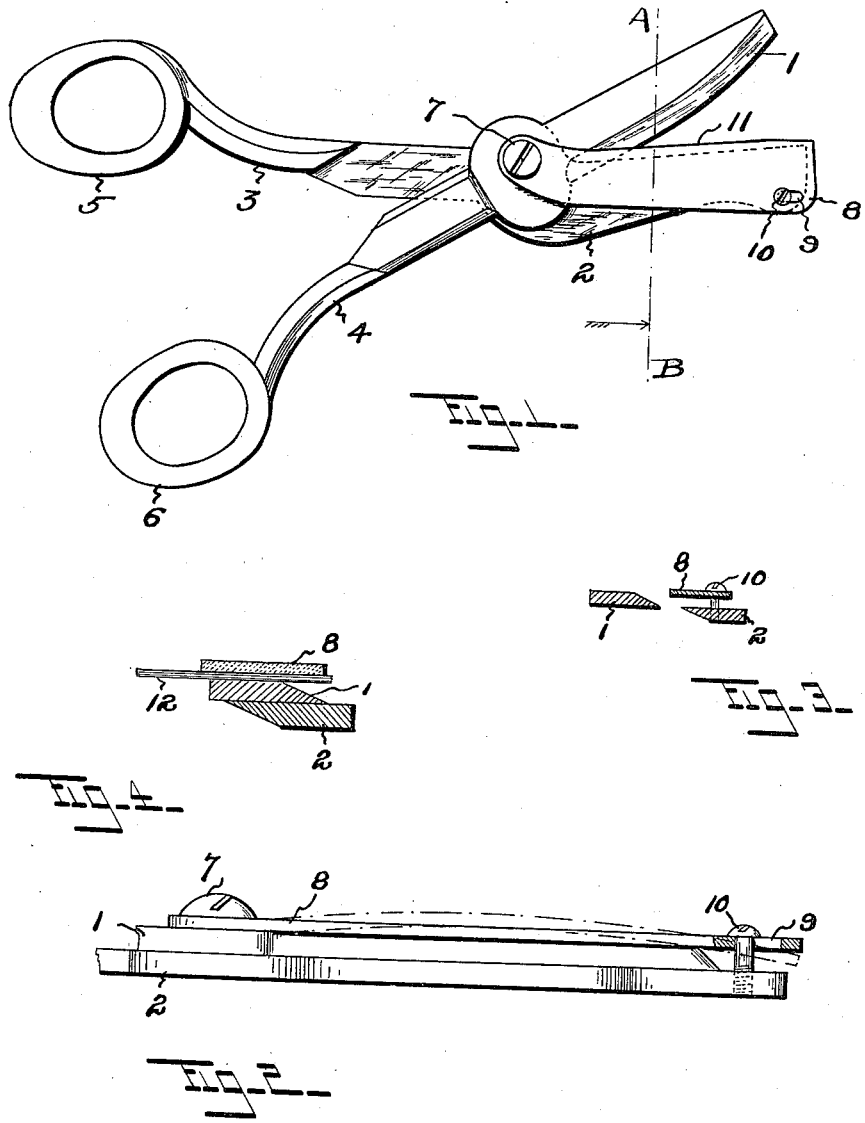

WALTER L. WEBSTER, OF NEW HAVEN, CONNECTICUT.

CUTTER AND TRIMMER.

1,009,203.      Specification of Letters Patent.      Patented Nov. 21, 1911.

Application filed February 13, 1911. Serial No. 608,400.

*To all whom it may concern:*

Be it known that I, WALTER L. WEBSTER, a citizen of the United States, residing at New Haven, in the county of New Haven and State of Connecticut, have invented a certain new and Improved Cutter and Trimmer, of which the following is a specification, reference being had therein to the accompanying drawings.

My invention relates to a new and improved cutter and trimmer, having for its object, among other things, to provide such a device with means to hold the severed portion after the cutting operation until subsequently released.

To these, and other ends, my invention consists in the cutter and trimmer having certain details of construction and combinations of parts, as will be hereinafter described, and more particularly pointed out in the claims.

Referring to the drawings, in which like numerals of reference designate like parts in the several figures; Figure 1 is a view of my improved device with the blades in their open positions; Fig. 2 is an enlarged fragmentary elevation thereof; Fig. 3 is a section thereof upon line A—B of Fig. 1; Fig. 4 is an enlarged sectional view upon the same line showing the blades in their relative positions when closed, with a portion of a severed article between one of the blades and the guard; and Fig. 5 is a plan view of a modified form of guard.

The device is especially useful in picking flowers and fruit, trimming lamp wicks, etc., the flowers, fruit or wick trimmings being held between the guard and blade, and there remaining until taken therefrom by the next opening of the blades.

My invention is invaluable where it is necessary to reach a considerable distance to gather either fruit or flowers, and while it is shown herein constructed as the ordinary shears, yet I desire it to be understood that the length of the handle is immaterial, it being capable of extension, as desired.

In the drawings, the numerals 1 and 2 designate the blades, having the handles 3 and 4 connected therewith, as is usual, and terminating in the finger bows 5 and 6, said blades being pivotally connected by means of the screw 7. The blades shown in the drawings are only two of the many types that are equally adapted to my invention, the cutting edge of the blade 1 having a curved outer end, and the blade 2 substantially straight. The handles and blades, with their connecting bows, may be made in any desired or preferred form, and of any given or desired length, within my invention.

The guard, designated by the numeral 8 is secured by the screw 7, and has a slot 9 therein near its other end, through which passes the screw 10 that is threaded into the blade 2. A stud or pin can be substituted for this screw 10, if desired. The inner edge 11 of the guard is slightly curved, although not necessarily so, as it may be made straight or provided with teeth, as shown in Fig. 5.

In operation the blades are manipulated in the usual manner, and the fruit or flower stem, wick, or other severed object is held between the blade 1 and the guard 8, as shown in Fig. 4, wherein the severed object is designated by the numeral 12. At the next opening of the blades the severed object is released and drops out. The guard lies substantially parallel with the blade, but it bows slightly when holding the severed articles, as shown by broken lines in Fig. 2, the degree of curvature depending upon the thickness of said severed article, the slight endwise movement of the outer end of the guard being provided for by the slot 9 therein.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with pivoted blades; of a guard connected therewith and lying substantially parallel with said blades; and means for securing said guard at both ends so as to permit the same to be bowed between its ends.

2. In a device of the character described, the combination with pivoted blades; of a guard secured to one of said blades and parallel therewith, said securing means at one end permitting a limited movement of said guard in the direction of its length.

3. In a device of the character described, the combination with pivoted blades; of a guard substantially parallel with said blades and having a curved edge overhanging the cutting edge of one of said blades; and means for securing said guard at both ends so as to permit the same to bow between its ends.

4. In a device of the character described, the combination with pivoted blades; of a guard lying substantially parallel with said blades, connected at one end to the pivotal connection of said blades; and means for securing said guard at the other end so as to permit the same to have a slight movement in the direction of its length, said means comprising an opening in said guard and a screw passing through said opening and connected with one of said blades.

In testimony whereof I affix my signature in presence of two witnesses.

WALTER L. WEBSTER.

Witnesses:
GEORGE E. HALL,
FLORENCE H. MONK.

Copies of this patent may be obtained for five cents each, by addressing the "Commissioner of Patents, Washington, D. C."